United States Patent
Jha et al.

(10) Patent No.: US 12,440,979 B2
(45) Date of Patent: Oct. 14, 2025

(54) SYSTEM AND METHOD FOR CONTROLLING AN OPERATION OF A ROBOTIC ARM

(71) Applicant: Mitsubishi Electric Research Laboratories, Inc., Cambridge, MA (US)

(72) Inventors: Devesh Jha, Cambridge, MA (US); Yuki Shirai, Los Angeles, CA (US); Arvind Raghunathan, Medford, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 271 days.

(21) Appl. No.: 18/145,869

(22) Filed: Dec. 23, 2022

(65) Prior Publication Data

US 2024/0208054 A1    Jun. 27, 2024

(51) Int. Cl.
    *B25J 9/16*    (2006.01)
    *B25J 13/08*   (2006.01)

(52) U.S. Cl.
    CPC ............ *B25J 9/1664* (2013.01); *B25J 9/1674* (2013.01); *B25J 13/084* (2013.01)

(58) Field of Classification Search
    CPC ...... B25J 9/1664; B25J 9/1674; B25J 13/084; B25J 9/1694; B25J 9/163; B25J 9/1628; B25J 9/1633; B25J 9/1656; B25J 9/1669; B25J 15/0019; B25J 15/04; B25J 19/028; G05B 2219/40074; G05B 2219/40566; G05B 2219/40619; G05B 2219/40626;
    (Continued)

(56) References Cited

U.S. PATENT DOCUMENTS

2021/0146532 A1* 5/2021 Rodriguez Garcia ...................... B25J 9/0087
2022/0274255 A1* 9/2022 Okawa .................. B25J 9/1697
(Continued)

OTHER PUBLICATIONS

Alvarez et al "Tactile-Based In-Hand Object Pose Estimation", 2017, Robot 2017: Third Iberian Robotics Conference, Advances in Intelligent Systems and Computing 694, https://doi.org/10.1007/978-3-319-70836-2_59 (Year: 2017).*
(Continued)

*Primary Examiner* — Abby Lin
*Assistant Examiner* — Esvinder Singh
(74) *Attorney, Agent, or Firm* — Gene Vinokur

(57) ABSTRACT

The present disclosure discloses a system and a method for controlling an operation of a robotic arm holding a tool for manipulating object. The method comprises collecting measurements of tactile sensors associated with the robotic arm, estimating, based on the collected measurements and constraints enforced by a Model Predictive Controller (MPC), a feedback signal indicative of a pose of the object, and executing the MPC configured to produce, based on the pose of the object, control commands for actuators of the robotic arm by optimizing a cost function minimizing a deviation of the pose of the object from a target pose of the object. The optimization of the cost function is subject to the constraints that constrain one or more forces acting on the object at one or more point of contacts to be within corresponding friction regions. The method further comprises controlling the actuators according to the control commands.

20 Claims, 16 Drawing Sheets

(58) Field of Classification Search
CPC ........... G05B 2219/40625; G05B 2219/39313; G05B 2219/40336; G05B 2219/42058; G05B 2219/23448; G05B 2219/39116; G05B 2219/39119; G05B 2219/40359; G05B 2219/40517
See application file for complete search history.

(56) References Cited

U.S. PATENT DOCUMENTS

| | | | |
|---|---|---|---|
| 2023/0294277 A1* | 9/2023 | Yang | G05B 19/4155 700/217 |
| 2023/0294306 A1* | 9/2023 | Nicholas | B25J 13/084 294/86.4 |

OTHER PUBLICATIONS

Hogan et al. Reactive Manipulation with contact models and tactile feedback, Feb. 1, 2020, pp. 1-120. https://dspace.mit.edu.handle/1721.1/125476.

Shirai et al., Tactile tool manipulation, 2023 IEEE Conference and Robotics and Automation, May 29, 2023. pp. 12597-12603.

Hogan et al. Tactile Dexterity: Manipulation primitives with tactile feedback, https://mcube.mit.edu/research/tactile_dexterity.html, https://arxiv.org/pdf/2002.03236.pdf.

\* cited by examiner

SYSTEM AND METHOD FOR CONTROLLING AN OPERATION OF A ROBOTIC ARM

TECHNICAL FIELD

The present disclosure relates generally to robotic manipulation, and more particularly to a system and a method for controlling an operation of a robotic arm holding a tool for manipulating an object.

BACKGROUND

In robotic systems, trajectory optimization is used to determine a control trajectory for a robot to perform a manipulation task of moving an object to a target pose from a given initial pose. The robotic system, for example, includes a robotic arm holding a tool to manipulate the object to move the object to a target pose. The manipulation of the object with the tool leads to multiple contact formations, for example, a contact between the robotic arm and the tool, a contact between the tool and the object, and a contact between the object and an environment. Using the contacts efficiently can provide additional dexterity to the robotic system while performing complex manipulation tasks.

However, most current generation robotic systems avoid making contact with their environment because contacts lead to complex, discontinuous dynamics during their movement and interaction. To that end, constraints imposed by the contacts are required to be incorporated in planning and controlling of the manipulation task. However, the incorporation of the constraints in the planning and controlling of the manipulation is challenging because of the discontinuities. Consequently, results from classical control theory for smooth and hybrid systems cannot be directly used for manipulation. Therefore, there is a need for a control system for controlling the robotic system to perform the manipulation task while satisfying the constraints imposed by the contacts.

SUMMARY

It is an object of some embodiments to provide a system and a method for controlling a manipulation system to perform manipulation of an object in an environment. The manipulation system includes a robotic arm holding a tool to manipulate the object. The manipulation of the object may correspond to re-orientation of the object, a pick and place operation, or an assembly operation. The manipulation of the object with the tool leads to multiple contact formations, for example, a contact between the robotic arm and the tool, a contact between the tool and the object, and a contact between the object and the environment. These contacts must be maintained during the manipulation. Hence, planning of the manipulation of the object needs to incorporate constraints imposed by the contacts, to ensure that the contacts are maintained during the manipulation. The incorporation of the constraints in the planning of the manipulation is challenging.

It is an object of some embodiments to design a closed-loop controller that can ensure maintenance of the contacts during the manipulation. It is also an object of some embodiments to enable robust implementation of a planned manipulation via the closed-loop controller using tactile sensors. Some embodiments provide a control system to implement such a closed-loop controller. The control system includes a processor and a memory. The processor may be a single core processor, a multi-core processor, a computing cluster, or any number of other configurations. The memory may include random access memory (RAM), read only memory (ROM), flash memory, or any other suitable memory systems. The memory stores a tactile estimator and a Model Predictive Controller (MPC). The tactile estimator and the MPC are executed by the processor.

The control system is communicatively coupled to the manipulation system. The tactile sensors are mounted on the robotic arm. For example, in an embodiment, the tactile sensors may be co-located at fingers of gripper of the robotic arm. The control system collects measurements of the tactile sensors. The measurements of the tactile sensors are input to the tactile estimator. The tactile estimator is configured to estimate a feedback signal indicative of a state of the object. The state of the object may include a pose of the object. Further, the estimated pose of the object is input to the MPC. The MPC is configured to produce, based on the pose of the object, control commands for actuators of the robotic arm of the manipulation system by optimizing a cost function minimizing a deviation of the pose of the object from a target pose of the object while satisfying the contact constraints required for the desired manipulation task.

The optimization of the cost function is subject to constraints that constrain forces acting on the object at point of contacts to satisfy physics of frictional interaction. For example, in case of sticking contact, the friction forces should be within the corresponding friction cone, to ensure that the contacts and are maintained during the manipulation. For example, the constraints constrain a force acting at the contact between the tool and the object to be within a corresponding friction region depending on a coefficient of friction between the tool and the object, and a force acting at the contact between the object and an environment to be within a corresponding friction region, to ensure that the aforesaid contacts are maintained during the manipulation. The contact forces acting at the contact points depend on a type of contact formation and physical properties of the object. For example, for sticking contact, friction forces should follow coulomb law of friction. Under this law, the friction forces lie within the friction cone for sticking contact and lie exactly on a boundary for slipping contact (i.e., when the objects slide over each other).

Further, the control system controls the actuators of the robotic arm according to the control commands. In such a manner, the control system controls the manipulation while maintaining the contacts.

The constraints that constrain the forces acting on the object at point of contacts to be within corresponding friction regions are formulated using a contact model of the manipulation. Some embodiments are based on the understanding that the contact model of the manipulation can be obtained using principles of quasi-static equilibrium under an assumption that the object and the tool stay in contact during the manipulation. In other words, the contact model designed using the principles of quasi-static equilibrium assumes zero slippage, i.e., no slipping at the point of contacts, such as between the tool and the object as well as between the object and an environment.

Some embodiments are based on the realization that the control system can be used for recovery from deviation from planned trajectories or in events of unexpected contacts. During online control, the control system collects measurements from the tactile sensors and estimates the pose of the object using the tactile estimator. The control system further executes the MPC that determines, based on the estimated pose of the object, control commands that recovers deviation from the planned trajectories. Additionally, the control system can be used to manipulate objects of different size and shape such as a bolt and a bottle, without losing the contacts during the manipulation. Additionally, in some embodiments, the control system can perform tool manipulation with different object-tool-environment pairs. Since the control system can manipulate the objects of different size and shape, without losing the contacts during the manipulation, the control system can be used to control the robotic arm to perform objects arrangement task.

Some embodiments are based on the realization that the pose of the object to be controlled during manipulation is not directly observable since the robotic arm is controlling the object using the tool. There is no sensor to observe the pose of the object directly. Thus, to perform feedback control, the control system uses the tactile estimator that uses the tactile sensor measurements and the constraints to estimate the pose of the object. The MPC and the tactile estimator work synchronously to perform stable control of the manipulation. The MPC uses the pose estimated by the tactile estimator to compute control signals that ensure the contacts are maintained throughout the manipulation. The tactile estimator estimates the pose of the object by making use of an assumption that the constraints are satisfied during the manipulation.

Accordingly, one embodiment discloses a control system for controlling an operation of a robotic arm holding a tool for manipulating an object. The control system comprises at least one processor; and a memory having instructions stored thereon that cause the at least one processor of the control system to: collect measurements of at least one tactile sensor associated with the robotic arm; estimate, based on the collected measurements and constraints enforced by a Model Predictive Controller (MPC), a feedback signal indicative of a pose of the object; execute the MPC configured to produce, based on the pose of the object, control commands for actuators of the robotic arm by optimizing a cost function minimizing a deviation of the pose of the object from a target pose of the object, wherein the optimization of the cost function is subject to the constraints, and wherein the constraints constrain one or more forces acting on the object at one or more point of contacts to be within corresponding friction regions; and control the actuators of the robotic arm according to the control commands.

Accordingly, another embodiment discloses a method for controlling an operation of a robotic arm holding a tool for manipulating an object. The method comprises collecting measurements of at least one tactile sensor associated with the robotic arm; estimating, based on the collected measurements and constraints enforced by a Model Predictive Controller (MPC), a feedback signal indicative of a pose of the object; executing the MPC configured to produce, based on the pose of the object, control commands for actuators of the robotic arm by optimizing a cost function minimizing a deviation of the pose of the object from a target pose of the object, wherein the optimization of the cost function is subject to the constraints, and wherein the constraints constrain one or more forces acting on the object at one or more point of contacts to be within corresponding friction regions; and controlling the actuators of the robotic arm according to the control commands.

Accordingly, yet another embodiment discloses a non-transitory computer-readable storage medium embodied thereon a program executable by a processor for performing a method for controlling an operation of a robotic arm holding a tool for manipulating an object. The method comprises collecting measurements of at least one tactile sensor associated with the robotic arm; estimating, based on the collected measurements and constraints enforced by a Model Predictive Controller (MPC), a feedback signal indicative of a pose of the object; executing the MPC configured to produce, based on the pose of the object, control commands for actuators of the robotic arm by optimizing a cost function minimizing a deviation of the pose of the object from a target pose of the object, wherein the optimization of the cost function is subject to the constraints, and wherein the constraints constrain one or more forces acting on the object at one or more point of contacts to be within corresponding friction regions; and controlling the actuators of the robotic arm according to the control commands.

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
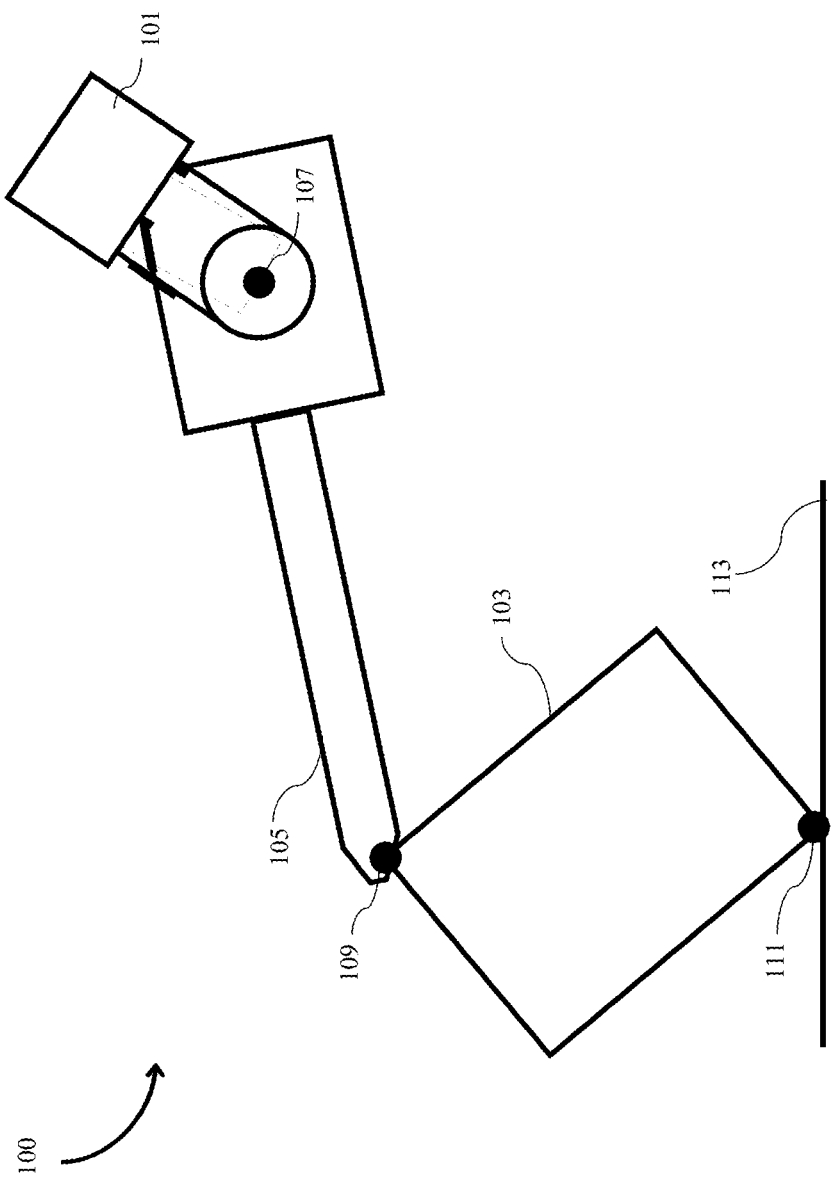
FIG. 1A illustrates a manipulation system, according to some embodiments of the present disclosure.

FIG. 1A illustrates a manipulation system 100, according to some embodiments of the present disclosure. The manipulation system 100 includes a robotic arm 101 configured to manipulate an object 103. In an embodiment, the robotic arm 101 is configured to hold a tool 105 to manipulate the object 103 in an environment. The manipulation of the object 103 may correspond to re-orientation of the object 103, a pick and place operation, or an assembly operation. The manipulation of the object 103 with the tool 105 leads to multiple contact formations, for example, a contact 107 between the robotic arm 101 and the tool 105, a contact 109 between the tool 105 and the object 103, and a contact 111 between the object 103 and an environment 113. The contacts 107, 109, and 111 have to be maintained during the manipulation. Hence, planning of the manipulation of the object 103 using the tool 105 needs to incorporate constraints imposed by the contacts 107, 109, and 111, to ensure that the contacts 107, 109, and 111 are maintained during the manipulation. The incorporation of the constraints in the planning of the manipulation is challenging.

It is an object of some embodiments design a closed-loop controller that can ensure maintenance of the contacts during the manipulation. It is also an object of some embodiments to enable robust implementation of a planned manipulation via the closed-loop controller using tactile sensors. Such a closed-loop controller is described below in FIG. 1B.

Figure 1B:
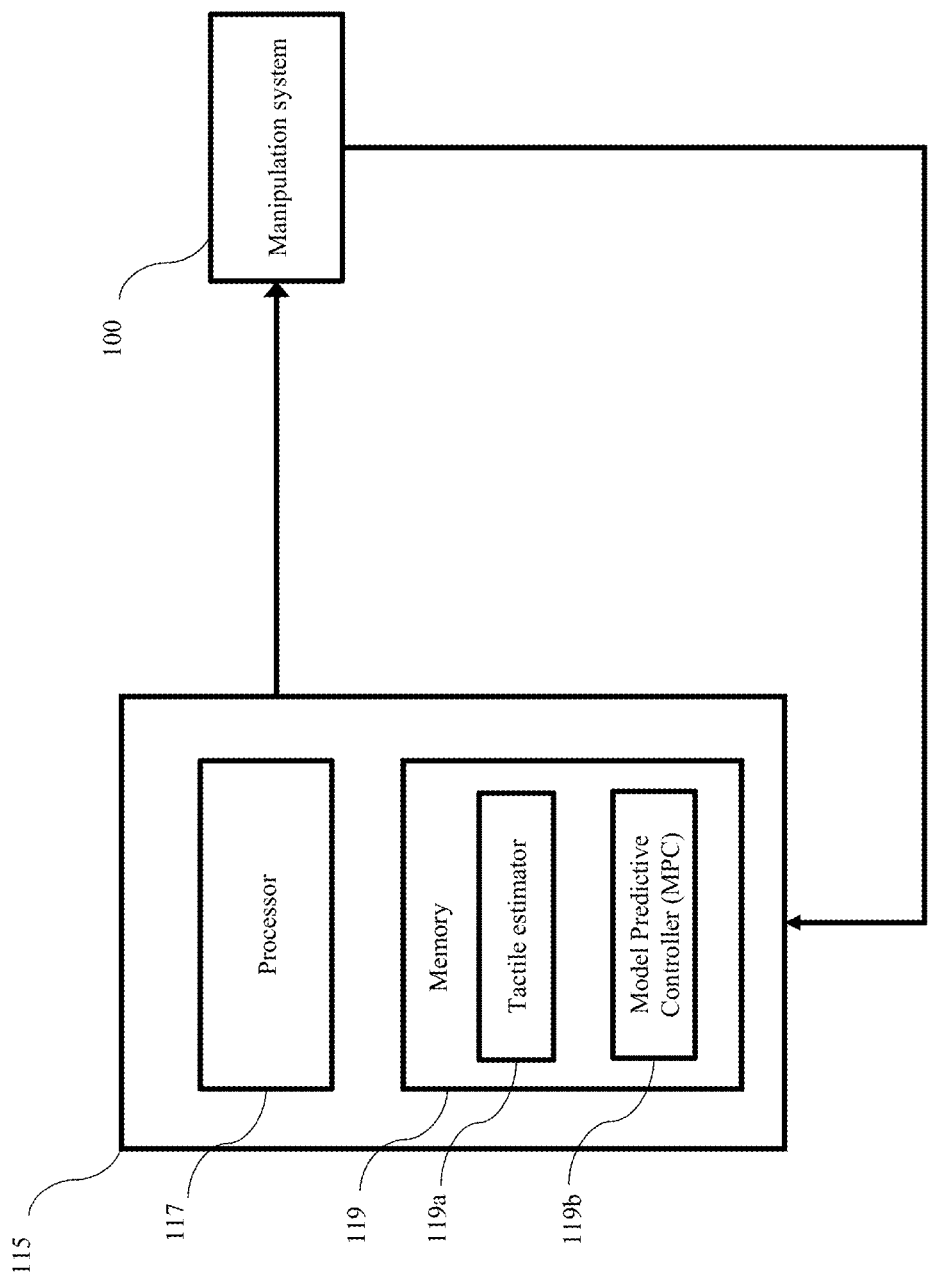
FIG. 1B shows a block diagram of a control system for controlling an operation of a robotic arm of the manipulation system, according to some embodiments of the present disclosure.

FIG. 1B shows a block diagram of a control system 115 for controlling the manipulation of the object 103, according to some embodiments of the present disclosure. The control system 115 includes a processor 117 and a memory 119. The processor 117 may be a single core processor, a multi-core processor, a computing cluster, or any number of other configurations. The memory 119 may include random access memory (RAM), read only memory (ROM), flash memory, or any other suitable memory systems. Additionally, in some embodiments, the memory 119 may be implemented using a hard drive, an optical drive, a thumb drive, an array of drives, or any combinations thereof. The memory 119 stores a tactile estimator 119a and a Model Predictive Controller (MPC) 119b. The tactile estimator 119a and the MPC 119b are executed by the processor 117.

The control system 115 is communicatively coupled to the manipulation system 100. The tactile sensors are mounted on the robotic arm 101. For example, in an embodiment, the tactile sensors may be co-located at fingers of gripper of the robotic arm 101. The control system 115 collects measurements of the tactile sensors. The measurements of the tactile sensors are input to the tactile estimator 119a. The tactile estimator 119a is configured to estimate a feedback signal indicative of a state of the object 103. The state of the object 103 may include a pose of the object 103. Further, the estimated pose of the object 103 is input to the MPC 119b. The MPC 119b is configured to produce, based on the pose of the object, control commands for actuators of the robotic arm 101 of the manipulation system 100 by optimizing a cost function minimizing a deviation of the pose of the object 103 from a target pose of the object 103. The optimization of the cost function is subject to constraints that constrain forces acting on the object 103 at point of contacts 109 and 111 to be within corresponding friction regions, to ensure that the contacts 109 and 111 are maintained during the manipulation. The forces acting on the object 103 at the point of contacts 109 and 111 are described below in FIG. 1C.

Figure 1C:
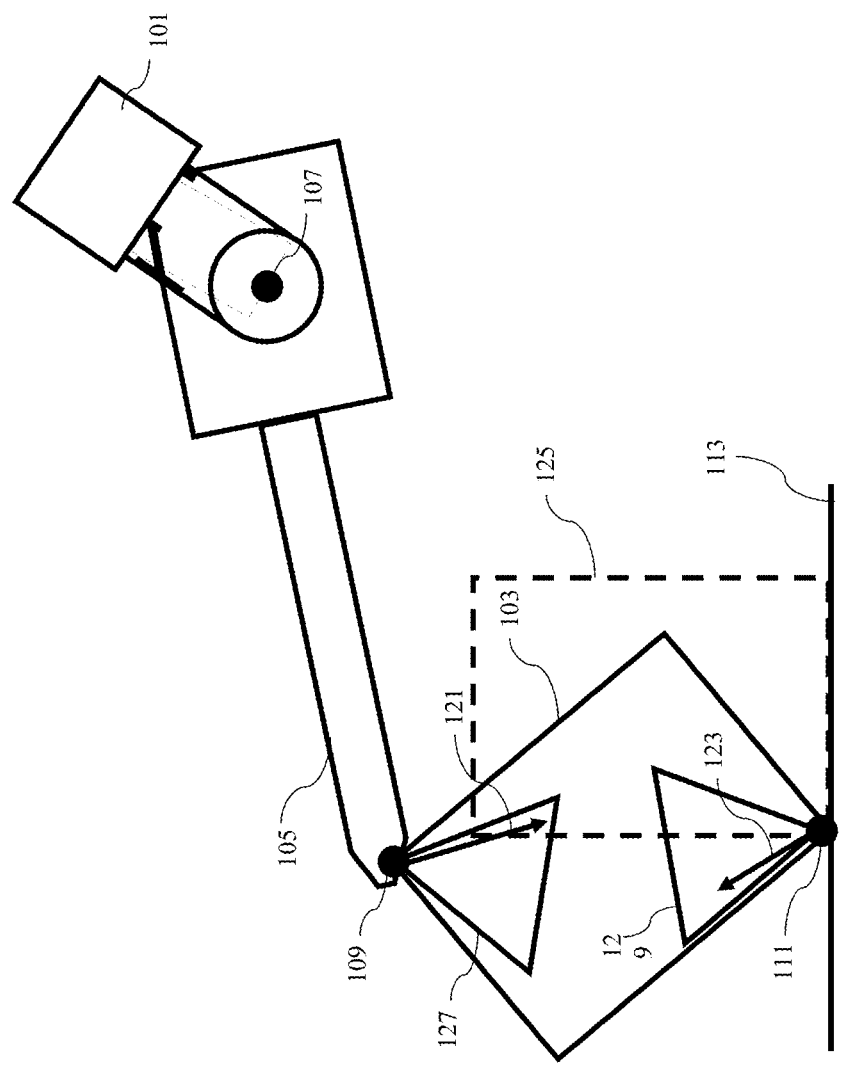
FIG. 1C illustrates different forces acting on an object at point of contacts, according to some embodiments of the present disclosure.

FIG. 1C illustrates different forces acting on the object 103 at the point of contacts 109 and 111, according to some embodiments of the present disclosure. Forces 121 and 123 are acting at the point of contacts 109 and 111, respectively. The MPC 119b produces, based on the pose of the object 103, the control commands for the actuators of the robotic arm 101 by optimizing the cost function minimizing a deviation of the pose of the object 103 from a target pose 125 of the object 103. The optimization of the cost function is subject to the constraints that constrain the force 121 acting at the point of contact 109 to be within a friction region 127 and the force 123 acting at the point of contact 111 to be within a friction region 129, to ensure that the contacts 109 and 111 are maintained during the manipulation. A shape of friction regions 127 and 129 depends on a coefficient of friction between two surfaces. Here, the shape of the friction regions 127 and 129 may be a cone.

Further, the control system 115 controls the actuators of the robotic arm 101 according to the control commands. In such a manner, the control system 115 controls the manipulation while maintaining the contacts 107, 109, and 111.

Figure 2A:
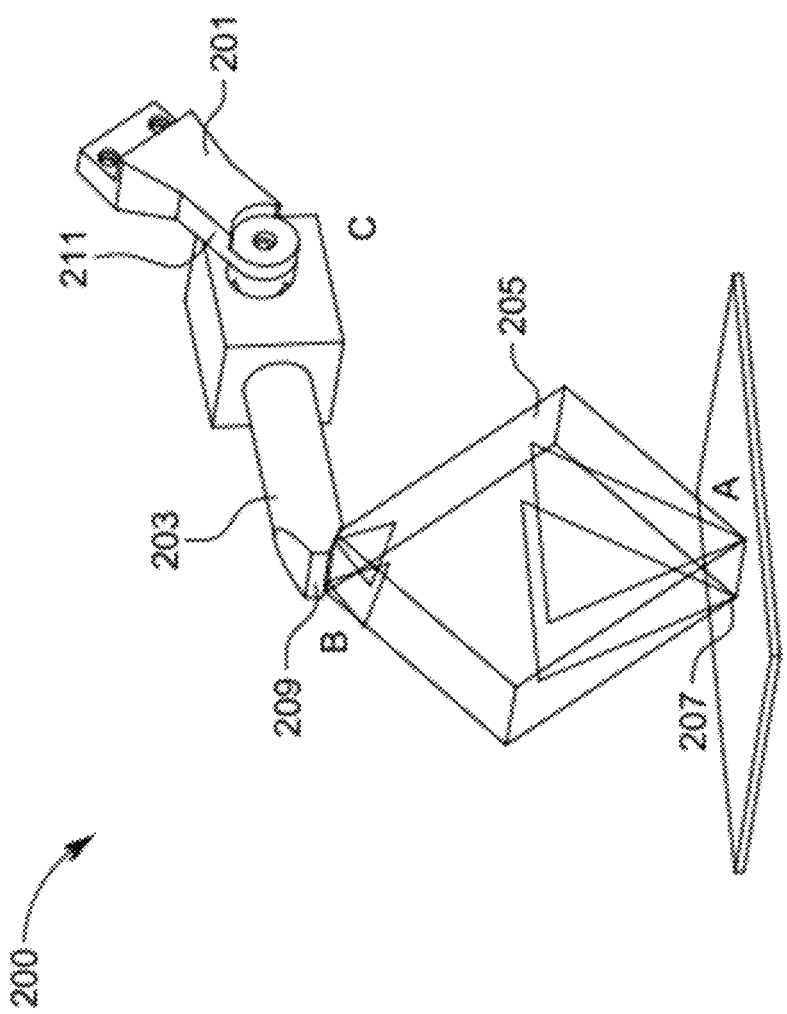
FIG. 2A shows a simplified 3D contact model of manipulation of the object, according to some embodiments of the present disclosure.
Figure 2B:
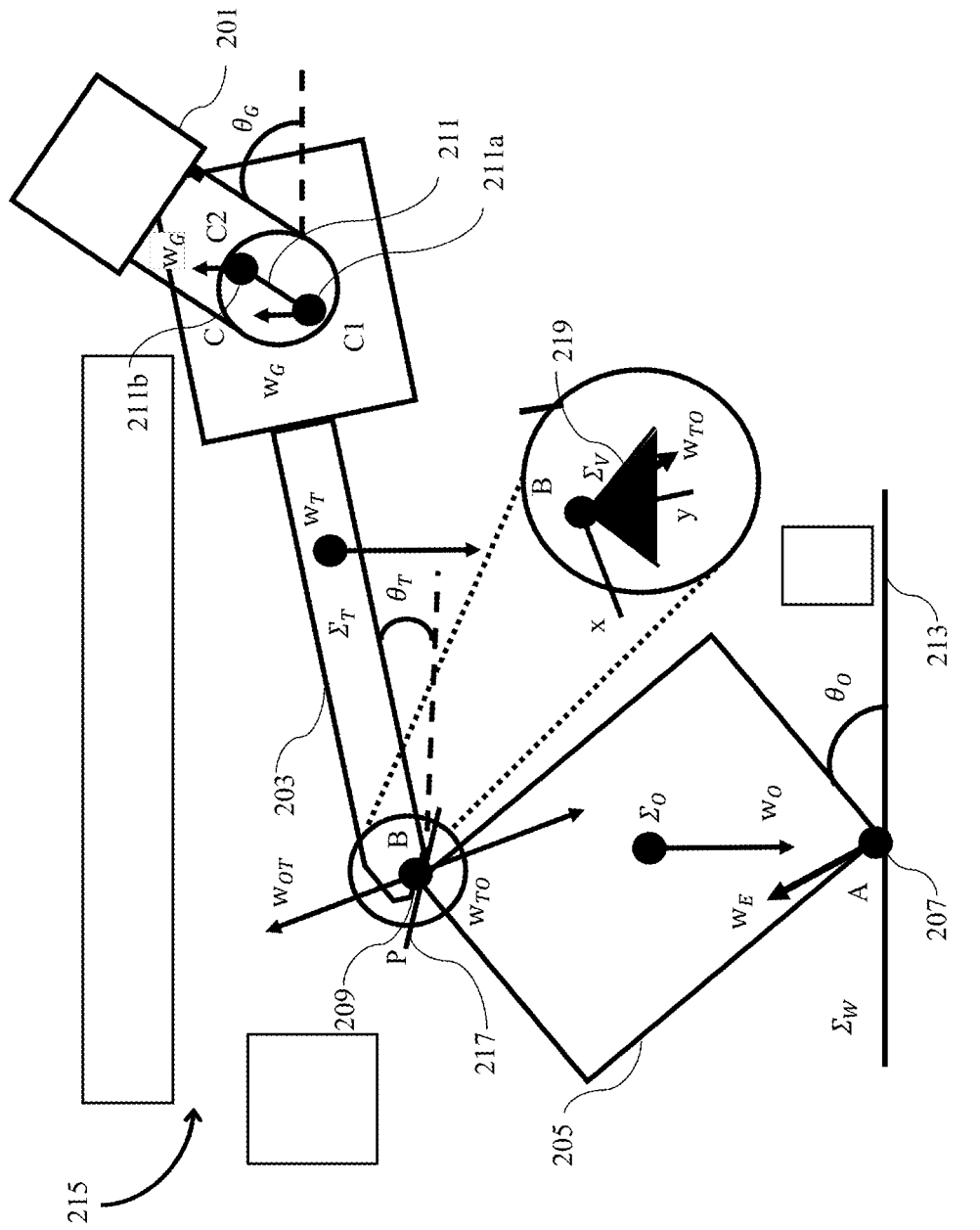
FIG. 2B shows a 2D contact model of the manipulation of the object, according to some embodiments of the present disclosure.

The constraints that constrain the forces acting on the object 103 at point of contacts 109 and 111 to be within corresponding friction regions are formulated using a contact model of the manipulation. FIG. 2A shows a simplified 3D contact model 200 of the manipulation, according to some embodiments of the present disclosure. The 3D contact model illustrates a robotic arm 201 holding a tool 203 for manipulating an object 205. The manipulation leads to different contact formations, such as contact 'A' 207, contact 'B' 209, and contact 'C' 211, that have to be maintained during the manipulation. In an embodiment, the contact 'A' 207 is a line contact, the contact 'B' 209 is a line contact, and the contact 'C' 211 is a patch contact. For the line contacts A and B, generalized friction cones are to be considered to describe sticking line contact in 3D. However, some embodiments are based on the realization that it is beneficial to consider a 2D contact model 215 of the manipulation as shown in FIG. 2B. Notation of variables shown in FIG. 2B are summarized in a tabular column below.

| Name | Description | Size | Σ |
|---|---|---|---|
| $w_E$ | Reaction wrench at point A | $\mathbb{R}^2$ | W |
| $w_O$ | Gravity of object at point O | $\mathbb{R}^2$ | W |
| $w_{TO}$ | Wrench from the tool | $\mathbb{R}^2$ | T |

-continued

| Name | Description | Size | Σ |
|---|---|---|---|
| | to the object at point B | | |
| $w_T$ | Gravity of tool at point T | $\mathbb{R}^2$ | W |
| $w_G$ | Wrench from the gripper to the tool at patch C | $\mathbb{R}^2$ | G |
| $\theta_O$ | Orientation/ pose of object | $\mathbb{R}^1$ | W |
| $\theta_T$ | Orientation of tool | $\mathbb{R}^1$ | W |
| $\theta_G$ | Orientation of gripper | $\mathbb{R}^1$ | W |
| $\theta_S$ | Relative orientation of frame at center of grasp | $\mathbb{R}^1$ | S |

Σ column in the above tabular column indicates a frame of variables. A rotation matrix from frame $\Sigma_A$ to $\Sigma_B$ is defined as $_B^A R$. Denote $p_i$ as a position at contact i defined in $\Sigma_W$. Denote x- and y-axis as axes in 2D plane and z-axis is perpendicular to the plane. In the present disclosure, it is assumed that the object 205 and the tool 203 are rigid, the object 205 and the tool 203 always stay in quasi-static equilibrium, and kinematics of the tool 203 and friction coefficients for different contact formations are known. Some embodiments are based on the understanding that the contact model of the manipulation can be obtained using principles of quasi-static equilibrium under an assumption that the object 205 and the tool 203 stay in contact during the manipulation. In other words, the contact model designed using the principles of quasi-static equilibrium assumes zero slippage, i.e., no slipping at the point of contacts, such as between the tool 203 and the object 205 as well as between the object 205 and an environment 213. A static equilibrium of the object 205 is described as $$F_O(w_E, w_O, {}_T^W R w_{TO}) = 0, \quad (1a)$$

$$G_O(w_E, w_O, {}_T^W R w_{TO}, p_A, p_B, p_O) = 0 \quad (1b)$$

where $F_O$ and $G_O$ represent static equilibrium of force and moment, respectively.

The static equilibrium of the tool 203 is:

$$F_T(w_T, {}_G^W R w_G, {}_T^W R w_{OT}) = 0, \quad (2a)$$

$$G_T(w_T, {}_G^W R w_G, {}_T^W R w_{OT}, pB, p_T, p_{G1}, p_{G2}) = 0 \quad (2b)$$

where $^T w_{TO} = -^T w_{OT}$. The patch contact at C 211 is approximated as two point contacts with the same force distribution, and thus $p_{C1}$, $p_{C2}$ are present in (2b).

Further, the line contacts A and B are approximated as two point contacts with the same force distribution, leading to larger coefficients of friction effectively. For the patch contact at C, 4D limit surface having 3D force $[f_x, f_y, f_z]$ and 1D moment $m_z$ is considered. However, in practice, implementing $m_z$ is difficult, especially for position-controlled manipulators with a force controller with low bandwidth. Thus, the patch contact at C 211 is approximated as two point contacts $C_1$ 211a and $C_2$ 211b with same force distribution. Such an approximation makes low-level controllers track a force trajectory easily.

For point contacts A, B, $C_1$, $C_2$, friction cone constraints are given as:

$$-\mu_i f_y^i \le f_x^i \le \mu_i f_y^i, \, f_y^i \ge 0, \, \forall \, i = \{A, B, C_1, C_2\} \quad (3)$$

where $\mu_i$ is a coefficient of friction at contact i={A, B, $C_1$, $C_2$} and $f_x^i$, $f_y^i$ are tangential and normal forces for each local coordinate. $\mu_i$ is set as $\mu_i = 2\mu_{i,point}$, i={A, B} where $\mu_{i,point}$ is a coefficient of friction between the environment and the contacts A, B to take into account line contact effects.

The line contact at B is on a certain plane P 217 created by the tool 203. The plane P 217 is used to determine a friction cone 219 between the object 205 and the tool 203 since slipping can only occur along the plane P 217. Thus, by changing an orientation of the tool 203, an orientation of the plane P 217 also changes. Such a change does not have an effect on the friction cone constraints (3) but does have an effect on the object 205 through the static equilibrium. Furthermore, different tools have different tip shapes. Based on kinematics of the tool 203, local force definition changes.

Some embodiments are based on the realization that the robotic arm 201 can apply forces along the axes where its motion is constrained. Such a constraint is desired to be explicitly enforced during optimization to generate mechanically feasible force trajectories. Hence, like the friction cone constraints, inequality constraints in vertex frame $\Sigma_V$ is formulated such that $w_{TO}$ is constrained by the object 205:

$$-\rho f_y \le f_x \le \rho f_y, \, f_y \ge 0 \quad (4)$$

where $[f_x, f_x]^\tau = {}_T^V R w_{TO}$. $\Sigma_V$ defined such that y-axis of $\Sigma_V$ bisect an angle of vertex B. $\rho$ can be determined by the shape of the object 205. To this end, $w_{TO}$ needs to satisfy both (3) and (4).

The quasi-static equilibrium of the tool 203 and the object 205 given by (1a)-(2b), the friction cone constraints (3), and the inequality constraints (4) are enforced as constraints in trajectory optimization for the manipulation and controlling of the manipulation by the MPC 119b.

According to an embodiment, the trajectory optimization for the manipulation can be formulated as follows:

$$\min_{x,u,f} \sum_{k=1}^{N} (x_k - x_g)^T Q(x_k - x_g) + \sum_{k=0}^{N-1} u_k^T R u_k \quad (5a)$$

$$\text{s.t. (1), (2), (3), (4),} \quad (5b)$$

$$x_0 = x_s, \, x_N = x_g, \, x_k \in X, \, u_k \in \mathcal{U}, \, f_k \in \mathcal{F} \quad (5c)$$

where $x_k = [\theta_{O,k}, \theta_{T,k}, \theta_{G,k}]^\tau$, $u_k = w_{G,k}$, $f_k = [w_{E,k}, w_{TO,k}]^\tau$, $Q = Q^\tau \ge 0$, $R = R^\tau > 0$. $\mathcal{X}$, $\mathcal{U}$, and $\mathcal{F}$ are convex polytopes, including a finite number of linear inequality constraints. $p_i$ can be calculated from kinematics with xx since it can be assumed that contacts ensure sticking contacts by satisfying (3). Based on the solution of (5), a pose and/or force trajectory of the tool 203 can determined. The pose and/or force trajectory of the tool 203 can be executed by the control system 115.

The control system 115 includes the tactile estimator 119a that can estimate the pose of the object 205 ($\theta_O$), using the tactile sensors, during the manipulation.

Figure 3A:
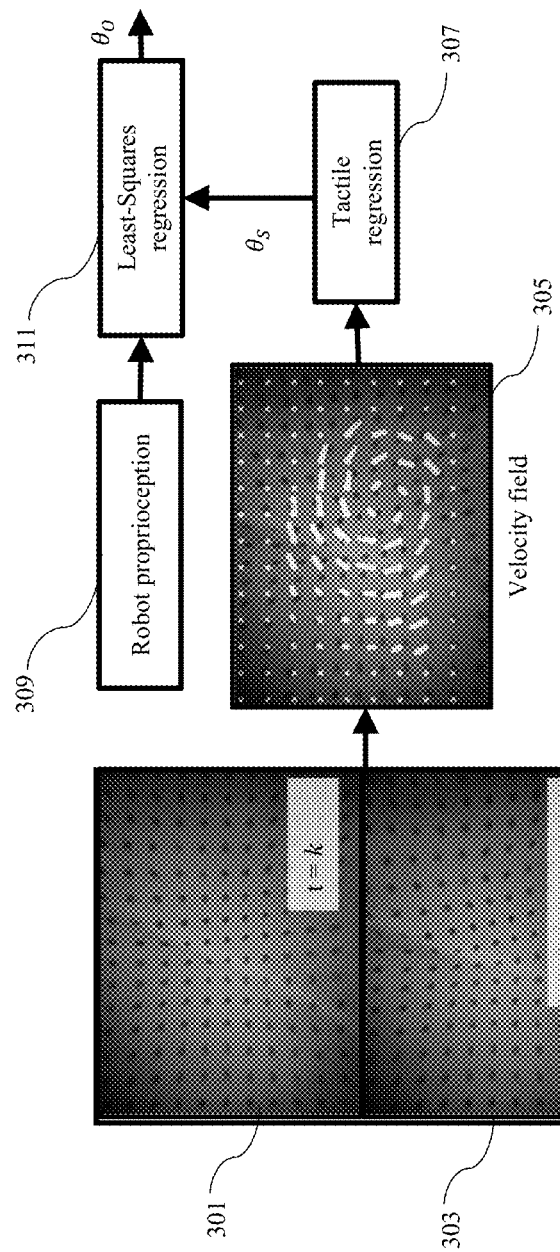
FIG. 3A illustrates a tactile estimator for estimating a pose of the object, according to some embodiments of the present disclosure.

FIG. 3A illustrates the tactile estimator 119a for estimating the pose of the object 205, according to some embodiments of the present disclosure. Some embodiments are based on the realization that the tactile sensors are deformable and thus, may have non-linear stiffness. Since the tactile sensors are deformable, the stiffness of the tactile sensors is determined to correctly estimate the slip of object 205 in grasp.

Figure 3B:
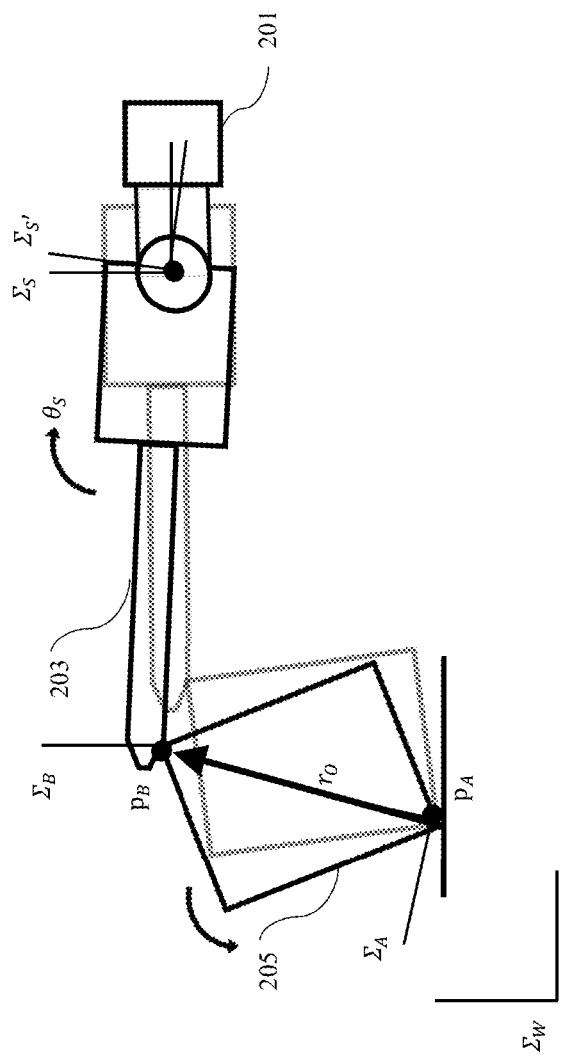
FIG. 3B illustrates a relative orientation of frame at center of grasp ($\theta_S$), according to some embodiments of the present disclosure.

Based on an image 301 at t=k and an image 303 at t=k+n, n>0 (i.e., measurements) from the tactile sensors, a velocity field 305 is computed. The velocity field 305 is input to a tactile regression 307. The tactile regression 307 outputs a relative orientation of frame at center of grasp ($\theta_S$). FIG. 3B illustrates the relative orientation of frame at center of grasp $\theta_S$, according to some embodiments of the present disclosure. It is assumed that the contacts at A and B are sticking, which means that $p_A$ does not change during the manipulation. Based on this assumption, an observed $p_B$ at t=k, denoted as $\bar{p}_{B,k}$, can be represented as:

$$[p_{B,k}^T, 1]^T = {}_S^W T\, {}_{S'}^S T(\theta_{S,k}) {}_B^{S'} T [0^T, 1]^T \quad (6)$$

where $\theta_{S,k}$ is a relative rotation of frame at the center of grasp at t=k (this frame denoted as $\Sigma_{S'}$) with respect to a frame at a reference center of grasp at t=0 (denoted as $\Sigma_S$). ${}_{S'}^S T, {}_S^W T$ can be obtained from the tactile sensor and encoders, respectively. ${}_B^S T$ is obtained from the known tool kinematics.

$p_B$ at t=k, denoted as $p_{B,k}$, can be represented as:

$$[p_{B,k}^T, 1]^T = {}_A^W T(\theta_{O,k} p_A) {}_B^A T(r_O) [0^T, 1]^T \quad (7)$$

Further, using (10) and (11), with measurements of robot proprioception 309, least-squares regression 311 is applied to estimate the pose of the object 205 as:

$$\{\theta_{O,k}^*\}_{k=0,\ldots,m}, r_O^*, p_A^* = \arg\min \sum_{k=0}^m \|p_{B,k} - \bar{p}_{B,k}\|^2 \quad (8)$$

In addition to the pose $\theta_{O,k}^*$ of the object 205, the tactile estimator 119a estimates a a length $r_O$ of the object 205. The measurements of robot proprioception 309 includes values internal to the manipulation system 100, such as, a motor speed, a wheel load, robotic arm joint angles, and a battery voltage.

Further, the estimated pose of the object is applied as input to the MPC 119b. According to an embodiment, the MPC 119b is an online controller given as follows:

$$\min_{x,u,f} \sum_{k=t+1}^{N+t} (\theta_{O,k} - \bar{\theta}_{O,k})^2 + \sum_{k=t}^{N+t-1} u_k^T R u_k \quad (9a)$$

$$\text{s.t. } (5b), (5c) \quad (9b)$$

where $\bar{\theta}_{O,k}$ represent a reference trajectory computed offline using (5).

Figure 4A:
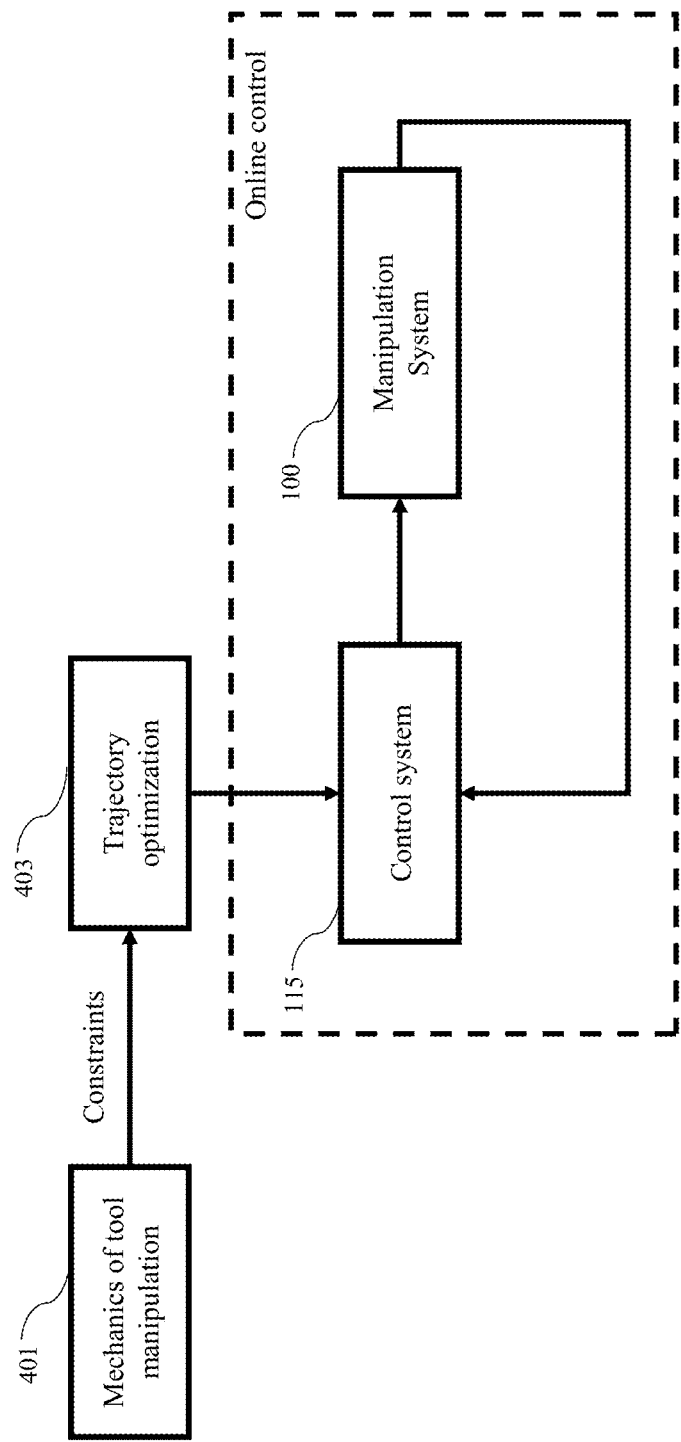
FIG. 4A shows a block diagram of an overall closed-loop manipulation, according to some embodiments of the present disclosure.

FIG. 4A shows a block diagram of an overall closed-loop manipulation, according to some embodiments of the present disclosure. Based on mechanics of tool manipulation, constraints (e.g., constraints (1a), (1b), (2a), (2b), (3), and (4)) for the manipulation are obtained. The constraints are enforced during the trajectory optimization (5) and then, they are used to compute a feasible trajectory for the manipulation. During online control, the control system 115 estimates the pose of the object 205 using the tactile estimator 119a. Further, the control system 115 executes the MPC 119b that determines, based on the estimated pose of the object 205, a new feasible sequence of control commands. The control commands are applied to the actuators of the manipulation system 100 to control the manipulation.

Some embodiments are based on the realization that the control system 115 can be used for recovery from deviation from planned trajectories or in events of unexpected contacts. During online control, the control system 115 collects measurements from the tactile sensors and estimates the pose of the object using the tactile estimator 119a. The control system 115 executes the MPC 119b that determines, based on the estimated pose of the object 205, control commands that recovers deviation from the planned trajectories.

Figure 4B:
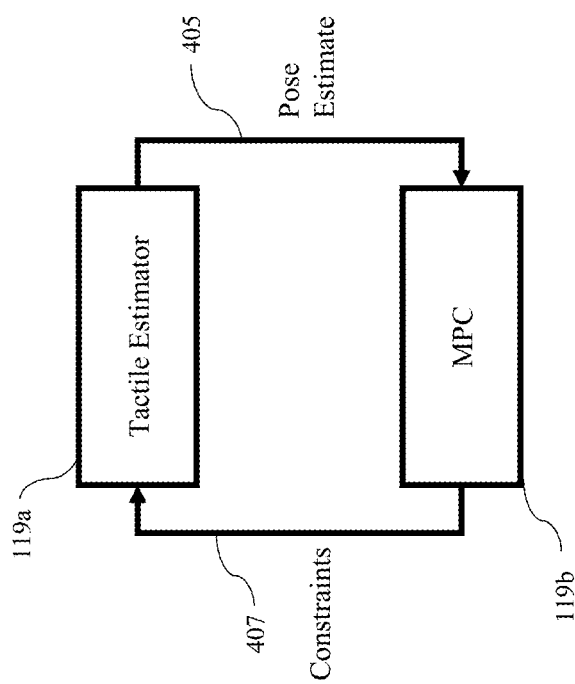
FIG. 4B shows a block diagram of synchronous operation of the tactile estimator and a Model Predictive Controller (MPC), according to some embodiments of the present disclosure.

FIG. 4B shows a block diagram that shows a synchronous operation of the tactile estimator 119a and the MPC 119b for stable operation of the closed loop control system 115. During online control, the tactile estimator 119a provides, to the MPC 119b, a feedback signal 405 indicative of the pose of the object being manipulated. The feedback signal 405 is used for the stable operation of the MPC 119b. Based on the pose of the object, the MPC 119b determines control signals that can enforce constraints 407 required for the manipulation. The tactile estimator 119a works under an assumption that the constraints 407 are enforced during the manipulation. Thus, the tactile estimator 119a and the MPC 119b run synchronously, helping each other for the stable operation.

Additionally, the control system 115 can be used to manipulate objects of different size and shape without losing the contacts during the manipulation. Additionally, in some embodiments, the control system 115 can perform tool manipulation with different object-tool-environment pairs.

Figure 5A:
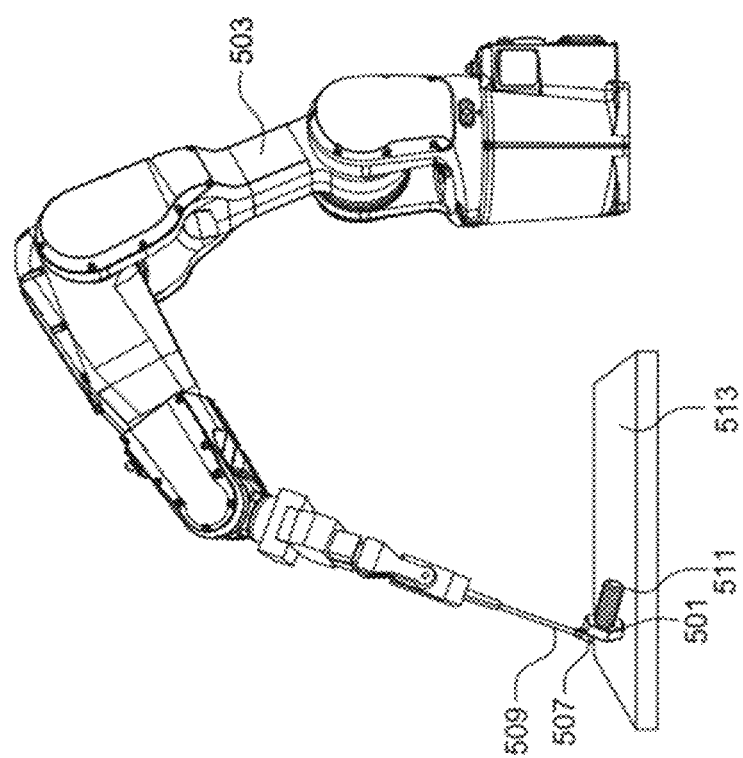
FIG. 5A illustrates a manipulation of a bolt, according to some embodiments of the present disclosure.
Figure 5A:
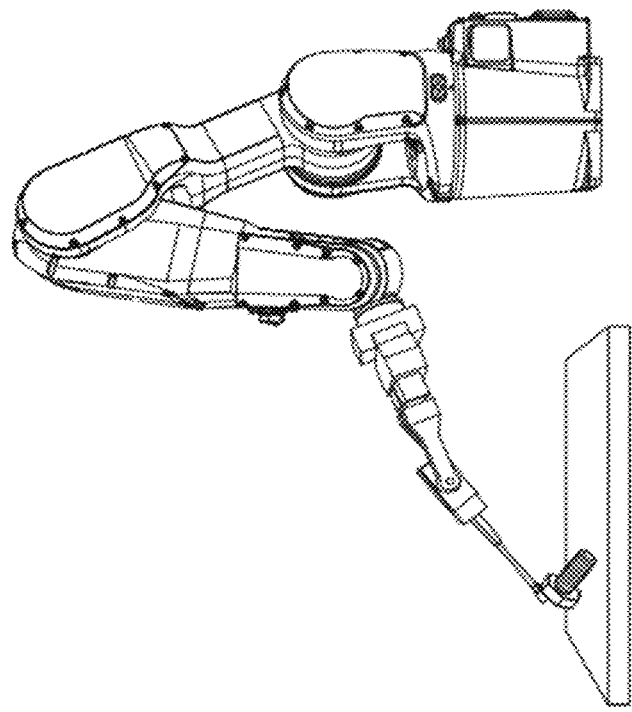
Figure 5A:
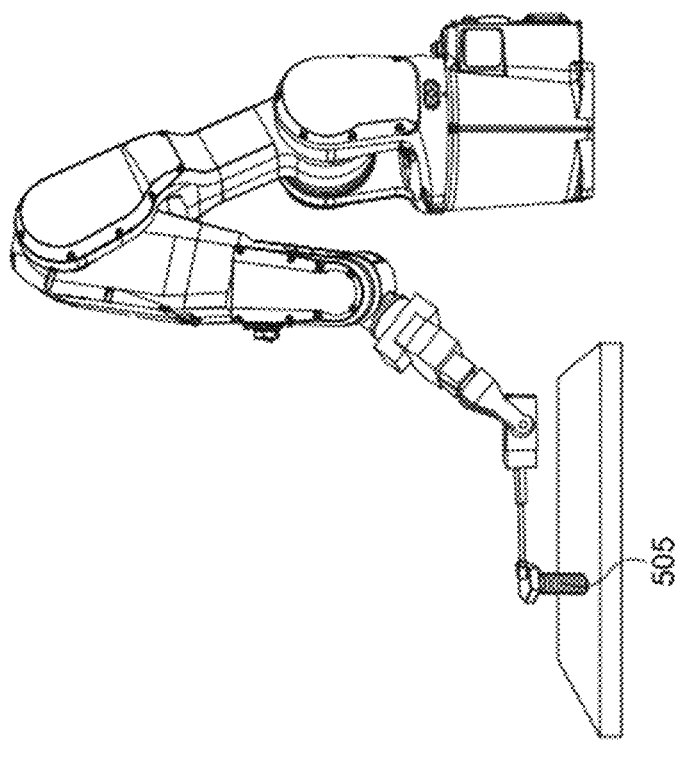
Figure 5A:
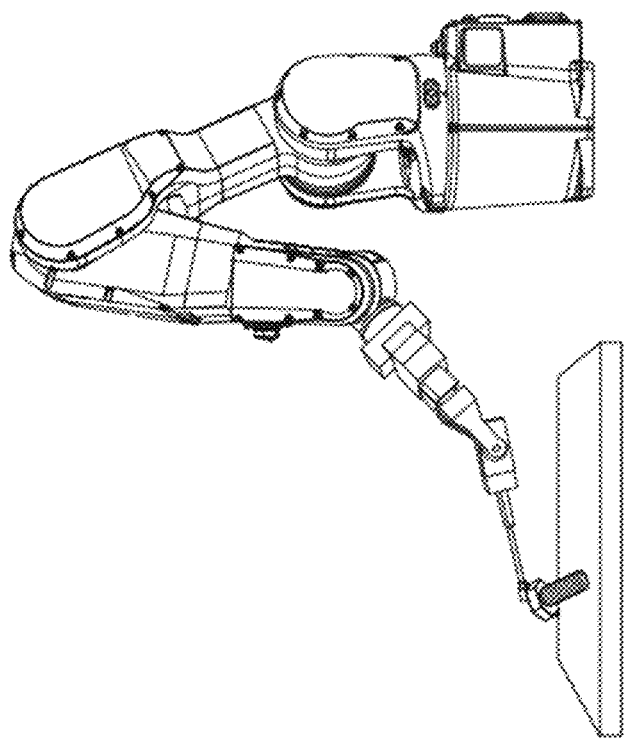

FIG. 5A illustrates a manipulation of a bolt 501, according to some embodiments of the present disclosure. The control system 115 (not shown in figure) is communicatively coupled to a robotic arm 503. As can be seen from FIG. 5A, the control system 115 controls the robotic arm 503 such that the bolt 501 is moved to a target pose 505 without losing a contact 507 between a tool 509 held by the robotic arm 503 and the bolt 501, and a contact 511 between the bolt 501 and an environment 513.

Figure 5B:
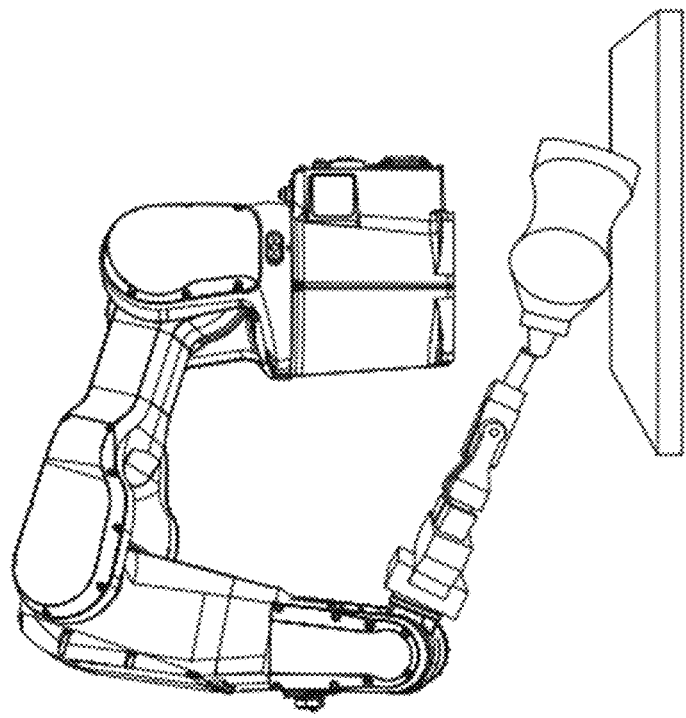
FIG. 5B illustrates a manipulation of a bottle, according to some embodiments of the present disclosure.
Figure 5B:
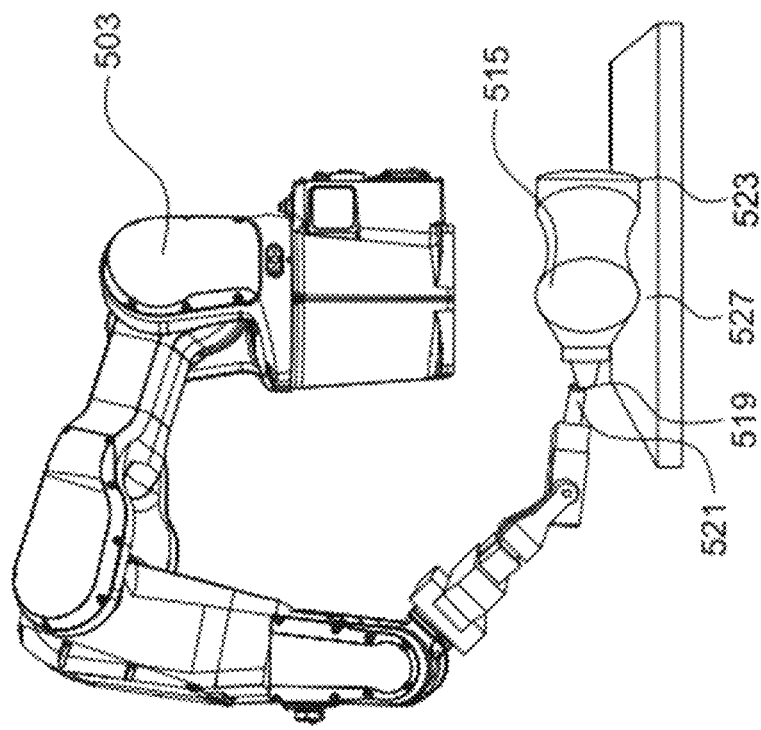
Figure 5B:
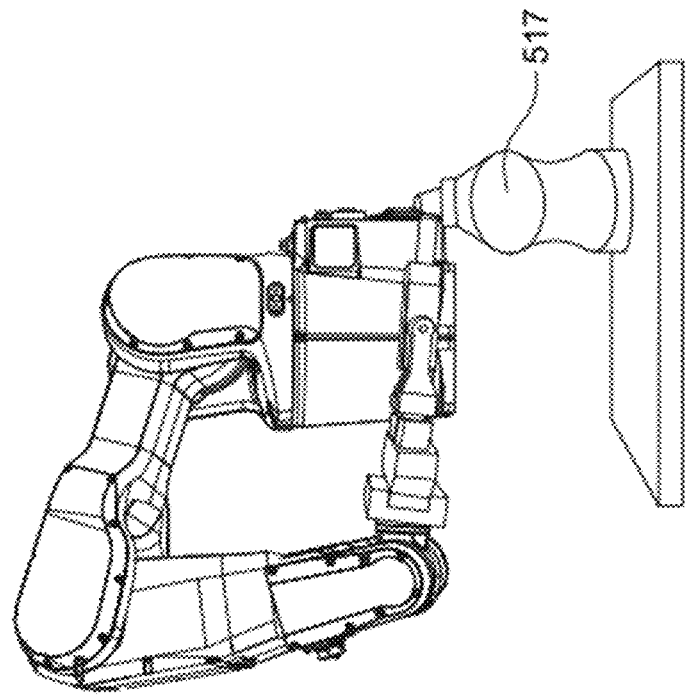
Figure 5B:
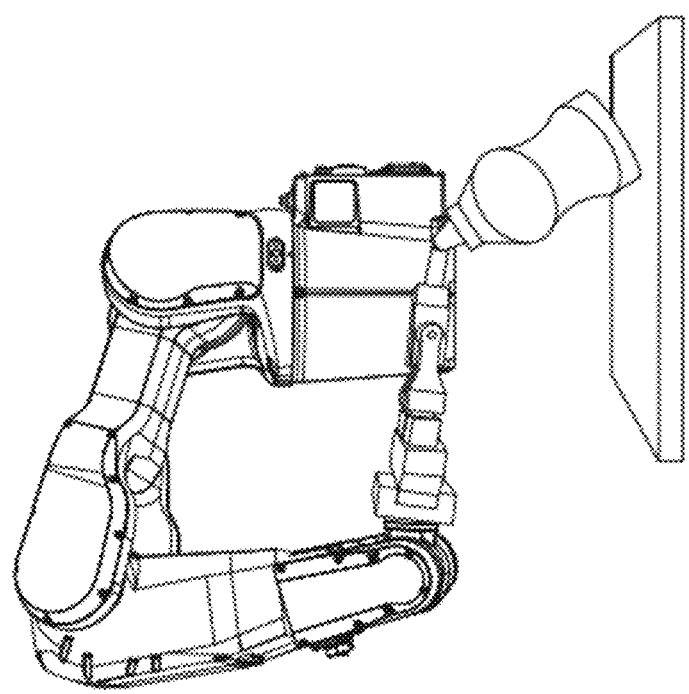

FIG. 5B illustrates a manipulation of a bottle 515, according to some embodiments of the present disclosure. As can be seen from FIG. 5B, the control system 115 (not shown in figure) controls the robotic arm 503 such that the bottle 515 is moved to a target pose 517 without losing a contact 519 between a tool 521 held by the robotic arm 503 and the bottle 515, and a contact 523 between the bottle 515 and an environment 527.

Since the control system 115 can control the robotic arm 503 to manipulate objects of different size and shape, such as the bolt 501 and the bottle 515, without losing the contacts during the manipulation, the control system 115 can be used to control the robotic arm 503 to perform objects arrangement task.

Figure 5C:
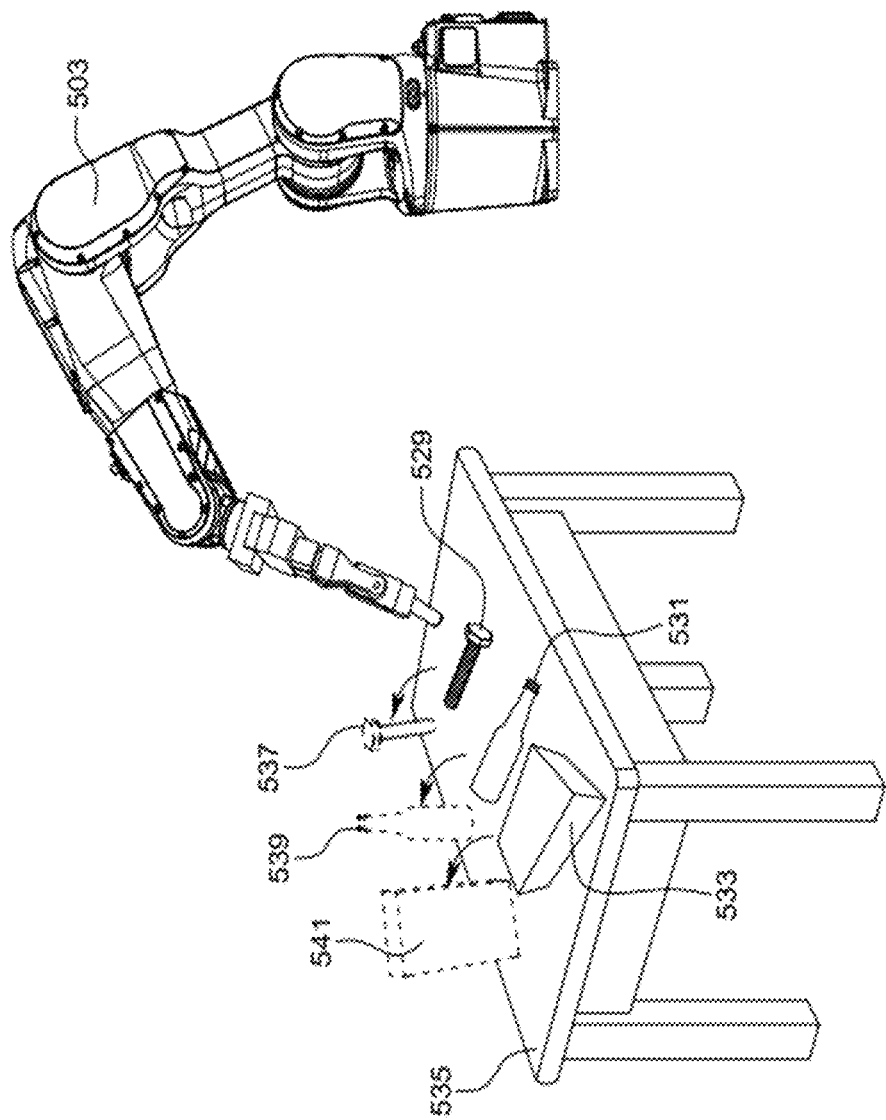
FIG. 5C illustrates an objects arrangement task, according to some embodiments of the present disclosure.

FIG. 5C illustrates an objects arrangement task, according to some embodiments of the present disclosure. Objects, such as a bolt 529, a bottle 531, and a box 533, are situated on a table 535. The control system 115 controls the robotic arm 503 to move each object to its respective target pose, to arrange the objects on the table 535. For example, the bolt 529, the bottle 531, and the box 533 are moved to target poses 537, 539, and 541, respectively. To that end, the control system 115 can arrange each object according to its respective target pose, irrespective of an initial pose of each object.

Figure 6:
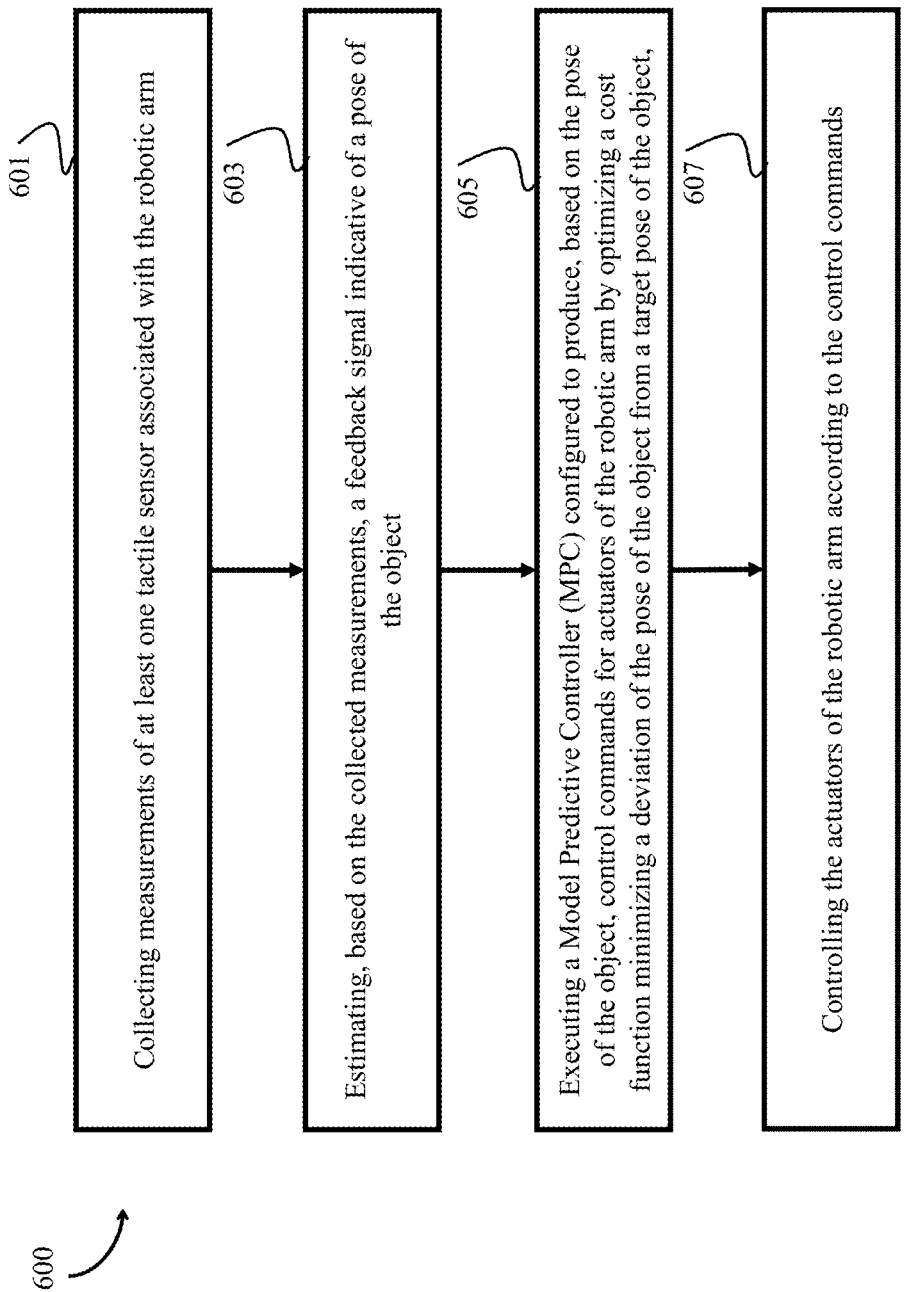
FIG. 6 shows a block diagram of a method for controlling an operation of a robotic arm holding a tool for manipulating an object, according to some embodiments of the present disclosure.

FIG. 6 shows a block diagram of a method 600 for controlling an operation of the robotic arm 101 holding the tool 105 for manipulating the object 103, according to some embodiments of the present disclosure. At block 601, the method 600 includes collecting measurements of at least one tactile sensor associated with the robotic arm 101. At block 603, the method 600 includes estimating, based on the collected measurements, a feedback signal indicative of a pose of the object 103.

At block 605, the method 600 includes executing the MPC 119b configured to produce, based on the pose of the object, control commands for actuators of the robotic arm 101 by optimizing a cost function minimizing a deviation of the pose of the object from a target pose of the object. The optimization of the cost function is subject to constraints (1a), (1b), (2a), (2b), (3), and (4) that constrain one or more forces acting on the object 103 at one or more point of contacts to be within corresponding friction regions.

At block 607, the method 600 includes controlling the actuators of the robotic arm 101 according to the control commands.

Figure 7:
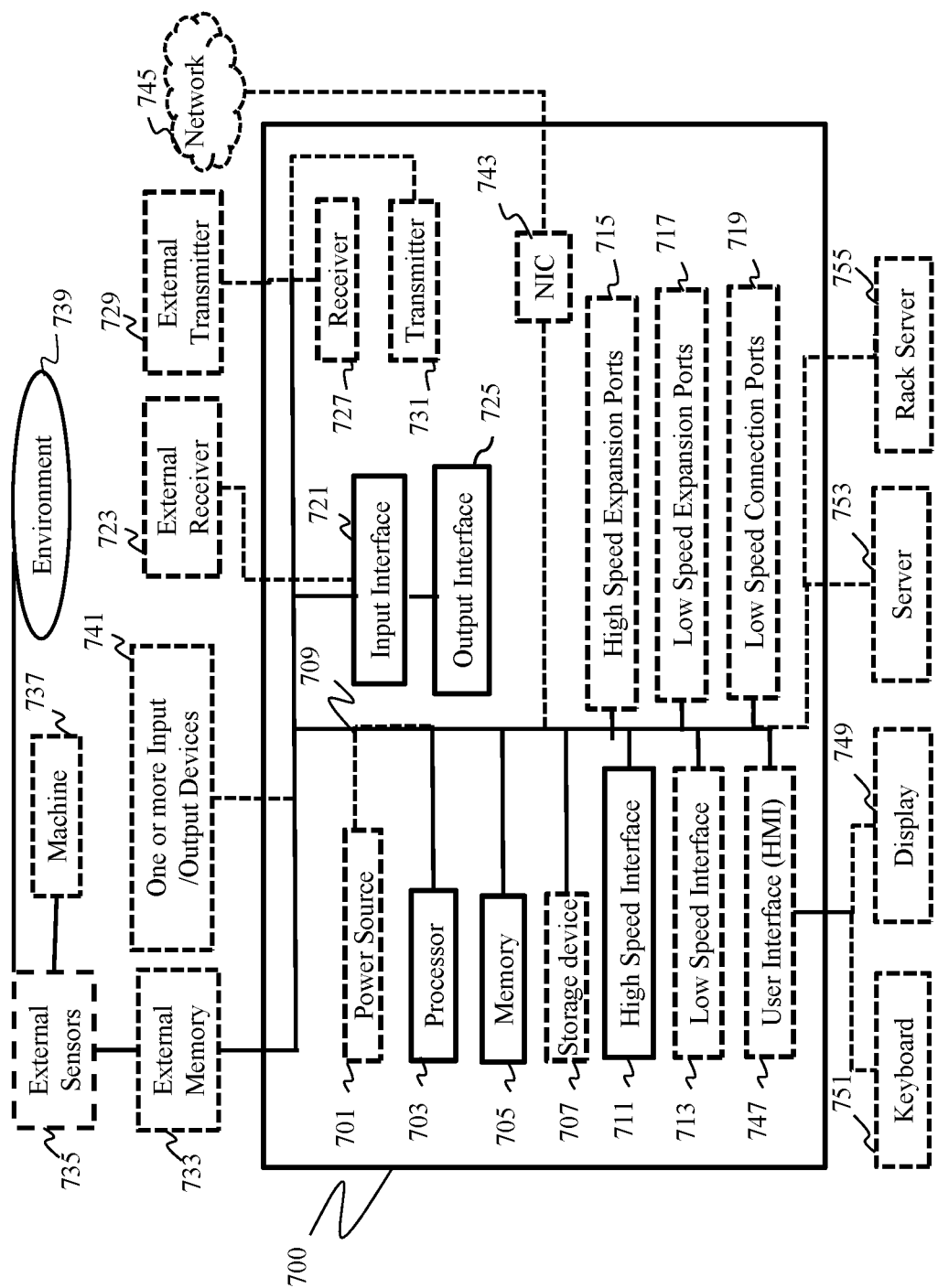
FIG. 7 is a schematic illustrating a computing device for implementing the methods and systems of the present disclosure.

FIG. 7 is a schematic illustrating a computing device 700 for implementing the methods and systems of the present disclosure. The computing device 700 includes a power source 701, a processor 703, a memory 705, a storage device 707, all connected to a bus 709. Further, a high-speed interface 711, a low-speed interface 713, high-speed expansion ports 715 and low speed connection ports 717, can be connected to the bus 709. In addition, a low-speed expansion port 719 is in connection with the bus 709. Further, an input interface 721 can be connected via the bus 709 to an external receiver 723 and an output interface 725. A receiver 727 can be connected to an external transmitter 729 and a transmitter 731 via the bus 709. Also connected to the bus 709 can be an external memory 733, external sensors 735, machine(s) 737, and an environment 739. Further, one or more external input/output devices 741 can be connected to the bus 709. A network interface controller (NIC) 743 can be adapted to connect through the bus 709 to a network 745, wherein data or other data, among other things, can be rendered on a third-party display device, third party imaging device, and/or third-party printing device outside of the computer device 700.

The memory 705 can store instructions that are executable by the computer device 700 and any data that can be utilized by the methods and systems of the present disclosure. The memory 705 can include random access memory (RAM), read only memory (ROM), flash memory, or any other suitable memory systems. The memory 705 can be a volatile memory unit or units, and/or a non-volatile memory unit or units. The memory 705 may also be another form of computer-readable medium, such as a magnetic or optical disk.

The storage device 707 can be adapted to store supplementary data and/or software modules used by the computer device 700. The storage device 707 can include a hard drive, an optical drive, a thumb-drive, an array of drives, or any combinations thereof. Further, the storage device 707 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 703), perform one or more methods, such as those described above.

The computing device 700 can be linked through the bus 709, optionally, to a display interface or user Interface (HMI) 747 adapted to connect the computing device 700 to a display device 749 and a keyboard 751, wherein the display device 749 can include a computer monitor, camera, television, projector, or mobile device, among others. In some implementations, the computer device 700 may include a printer interface to connect to a printing device, wherein the printing device can include a liquid inkjet printer, solid ink printer, large-scale commercial printer, thermal printer, UV printer, or dye-sublimation printer, among others.

The high-speed interface 711 manages bandwidth-intensive operations for the computing device 700, while the low-speed interface 713 manages lower bandwidth-intensive operations. Such allocation of functions is an example only. In some implementations, the high-speed interface 711 can be coupled to the memory 705, the user interface (HMI) 747, and to the keyboard 751 and the display 749 (e.g., through a graphics processor or accelerator), and to the high-speed expansion ports 715, which may accept various expansion cards via the bus 709. In an implementation, the low-speed interface 713 is coupled to the storage device 707 and the low-speed expansion ports 717, via the bus 709. The low-speed expansion ports 717, which may include various communication ports (e.g., USB, Bluetooth, Ethernet, wireless Ethernet) may be coupled to the one or more input/output devices 741. The computing device 700 may be connected to a server 753 and a rack server 755. The computing device 700 may be implemented in several different forms. For example, the computing device 700 may be implemented as part of the rack server 755.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A control system for controlling an operation of a robotic arm holding a tool for manipulating an object, comprising: at least one processor;
and a memory having instructions stored thereon that cause the at least one processor of the control system to:
collect measurements of at least one tactile sensor associated with the robotic arm;
estimate, based on the collected measurements and constraints enforced by a Model Predictive Controller (MPC), a feedback signal indicative of a pose of the object;
execute the MPC configured to produce, based on the estimated pose of the object, control commands for actuators of the robotic arm by optimizing a cost function minimizing a deviation of the pose of the object from a target pose of the object, wherein the optimization of the cost function is subject to the constraints, and wherein the constraints constrain one or more forces acting on the object at one or more point of contacts to be within corresponding friction regions, wherein a shape of the friction region is based on a shape of the object; and
control the actuators of the robotic arm according to the control commands.

2. The control system of claim 1, wherein the one or more point of contacts include a contact between the object and the tool and a contact between the object and an environment.

3. The control system of claim 1, wherein the constraints include a quasi-static equilibrium of the tool and the object with zero slippage at the one or more point of contacts.

4. The control system of claim 1, wherein the processor is further configured to collect measurements of robot proprioception and the measurements of the at least one tactile sensor.

5. The control system of claim 4, wherein the measurements of robot proprioception include values of one or more of a motor speed, robotic arm joint angles, and a battery voltage of the robotic arm.

6. The control system of claim 4, wherein the processor is further configured to:
compute, based on the measurements of the at least one tactile sensor, a relative orientation of frame at center of grasp of the object; and
execute, using the measurements of robot proprioception and the relative orientation of frame at center of grasp of the object, a least-squares regression to estimate the pose of the object.

7. A method for controlling an operation of a robotic arm holding a tool for manipulating an object, comprising:
collecting measurements of at least one tactile sensor associated with the robotic arm;
estimating, based on the collected measurements and constraints enforced by a Model Predictive Controller (MPC), a feedback signal indicative of a pose of the object;
executing the MPC configured to produce, based on the estimated pose of the object, control commands for actuators of the robotic arm by optimizing a cost function minimizing a deviation of the pose of the object from a target pose of the object, wherein the optimization of the cost function is subject to the constraints, and wherein the constraints constrain one or more forces acting on the object at one or more point of contacts to be within corresponding friction regions, wherein a shape of the friction region is based on a shape of the object; and
controlling the actuators of the robotic arm according to the control commands.

8. The method of claim 7, wherein the one or more point of contacts include a contact between the object and the tool and a contact between the object and an environment.

9. The method of claim 7, wherein the constraints include a quasi-static equilibrium of the tool and the object with zero slippage at the one or more point of contacts.

10. The method of claim 7, wherein the method further comprises collecting measurements of robot proprioception and the measurements of the at least one tactile sensor.

11. The method of claim 10, wherein the measurements of robot proprioception include values of one or more of a motor speed, robotic arm joint angles, and a battery voltage of the robotic arm.

12. The method of claim 10, wherein the method further comprises:
computing, based on the measurements of the at least one tactile sensor, a relative orientation of frame at center of grasp of the object; and
executing, using the measurements of robot proprioception and the relative orientation of frame at center of grasp of the object, a least-squares regression to estimate the pose of the object.

13. A non-transitory computer-readable storage medium embodied thereon a program executable by a processor for performing a method for controlling an operation of a robotic arm holding a tool for manipulating an object, the method comprising:
collecting measurements of at least one tactile sensor associated with the robotic arm;
estimating, based on the collected measurements and constraints enforced by a Model Predictive Controller (MPC), a feedback signal indicative of a pose of the object;
executing the MPC configured to produce, based on the estimated pose of the object, control commands for actuators of the robotic arm by optimizing a cost function minimizing a deviation of the pose of the object from a target pose of the object, wherein the optimization of the cost function is subject to the constraints, and wherein the constraints constrain one or more forces acting on the object at one or more point of contacts to be within corresponding friction regions, wherein a shape of the friction region is based on a shape of the object; and controlling the actuators of the robotic arm according to the control commands.

14. The non-transitory computer-readable storage medium of claim 13, wherein the one or more point of contacts include a contact between the object and the tool and a contact between the object and an environment.

15. The non-transitory computer-readable storage medium of claim 13, wherein the constraints include a quasi-static equilibrium of the tool and the object with zero slippage at the one or more point of contacts.

16. The non-transitory computer-readable storage medium of claim 13, wherein the method further comprises collecting measurements of robot proprioception and the measurements of the at least one tactile sensor.

17. The non-transitory computer-readable storage medium of claim 16, wherein the method further comprises:

computing, based on the measurements of the at least one tactile sensor, a relative orientation of frame at center of grasp of the object; and executing, using the measurements of robot proprioception and the relative orientation of frame at center of grasp of the object, a least-squares regression to estimate the pose of the object.

18. A control system for controlling an operation of a robotic arm holding a tool for manipulating an object, comprising: at least one processor; and a memory having instructions stored thereon that cause the at least one processor of the control system to:

collect measurements of at least one tactile sensor associated with the robotic arm and measurements of robot proprioception;

compute, based on the measurements of the at least one tactile sensor, a relative orientation of frame at center of grasp of the object:

execute, using the measurements of robot proprioception and the relative orientation of frame at center of grasp of the object, a least-squares regression to estimate the pose of the object;

estimate, based on the collected measurements and constraints enforced by a Model Predictive Controller (MPC), a feedback signal indicative of a pose of the object;

execute the MPC configured to produce, based on the estimated pose of the object, control commands for actuators of the robotic arm by optimizing a cost function minimizing a deviation of the pose of the object from a target pose of the object, wherein the optimization of the cost function is subject to the constraints, and wherein the constraints constrain one or more forces acting on the object at one or more point of contacts to be within corresponding friction regions; and control the actuators of the robotic arm according to the control commands.

19. A method for controlling an operation of a robotic arm holding a tool for manipulating an object, comprising:

collecting measurements of at least one tactile sensor associated with the robotic arm and measurements of robot proprioception;

computing, based on the measurements of the at least one tactile sensor, a relative orientation of frame at center of grasp of the object;

executing, using the measurements of robot proprioception and the relative orientation of frame at center of grasp of the object, a least-squares regression to estimate the pose of the object;

estimating, based on the collected measurements and constraints enforced by a Model Predictive Controller (MPC), a feedback signal indicative of a pose of the object;

executing the MPC configured to produce, based on the estimated pose of the object, control commands for actuators of the robotic arm by optimizing a cost function minimizing a deviation of the pose of the object from a target pose of the object, wherein the optimization of the cost function is subject to the constraints, and wherein the constraints constrain one or more forces acting on the object at one or more point of contacts to be within corresponding friction regions; and controlling the actuators of the robotic arm according to the control commands.

20. A non-transitory computer-readable storage medium embodied thereon a program executable by a processor for performing a method for controlling an operation of a robotic arm holding a tool for manipulating an object, the method comprising:

collecting measurements of at least one tactile sensor associated with the robotic arm and measurements of robot proprioception;

computing, based on the measurements of the at least one tactile sensor, a relative orientation of frame at center of grasp of the object;

executing, using the measurements of robot proprioception and the relative orientation of frame at center of grasp of the object, a least-squares regression to estimate the pose of the object;

estimating, based on the collected measurements and constraints enforced by a Model Predictive Controller (MPC), a feedback signal indicative of a pose of the object;

executing the MPC configured to produce, based on the estimated pose of the object, control commands for actuators of the robotic arm by optimizing a cost function minimizing a deviation of the pose of the object from a target pose of the object, wherein the optimization of the cost function is subject to the constraints, and wherein the constraints constrain one or more forces acting on the object at one or more point of contacts to be within corresponding friction regions; and controlling the actuators of the robotic arm according to the control commands.

* * * * *